Figure 1:
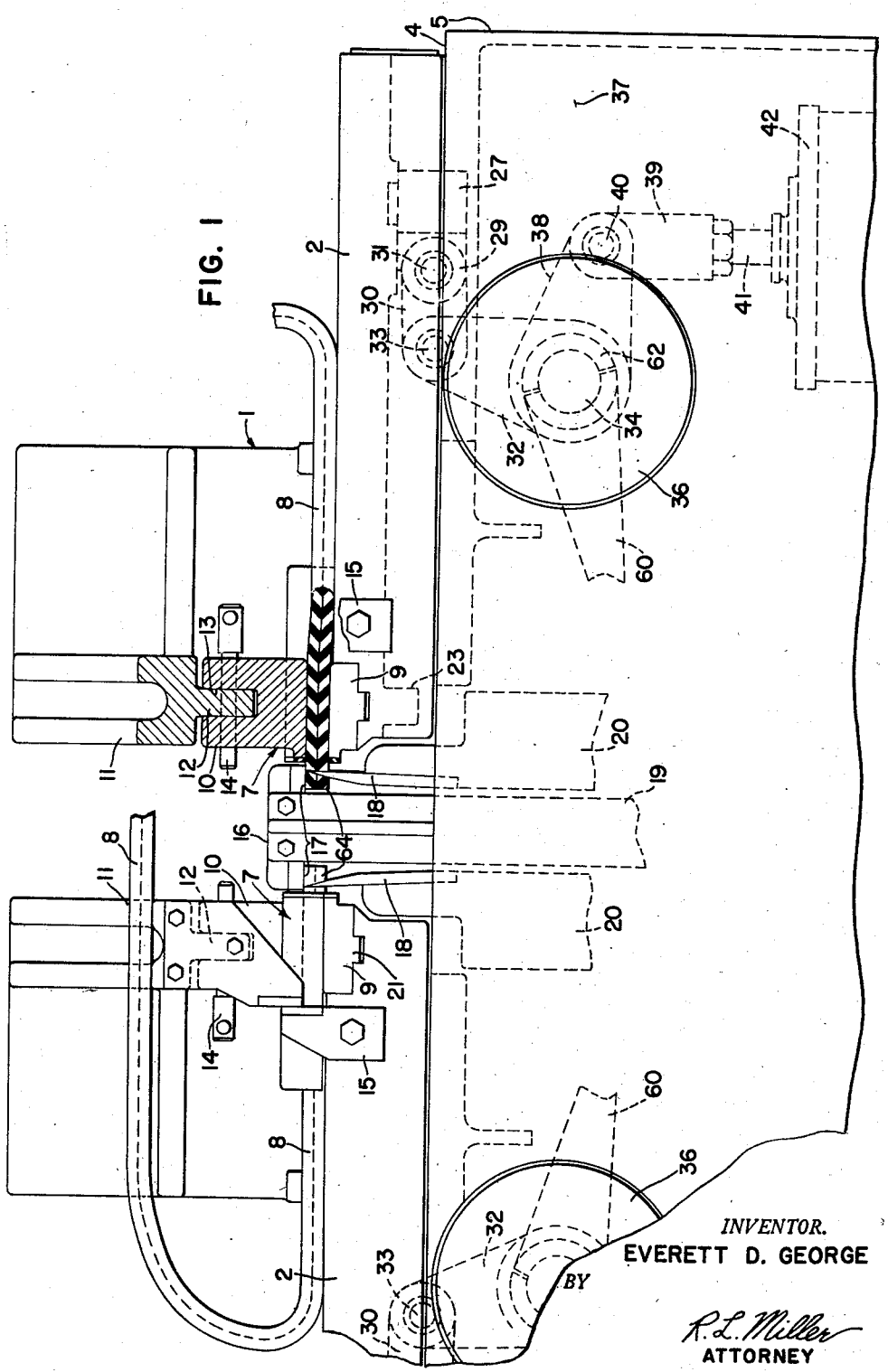

April 27, 1954     E. D. GEORGE     2,676,641
KNIFE CLEANING DEVICE FOR BUTT SPLICING APPARATUS
Filed Feb. 18, 1952     3 Sheets-Sheet 1

INVENTOR.
EVERETT D. GEORGE
BY
R. L. Miller
ATTORNEY

April 27, 1954  E. D. GEORGE  2,676,641
KNIFE CLEANING DEVICE FOR BUTT SPLICING APPARATUS
Filed Feb. 18, 1952  3 Sheets-Sheet 3

INVENTOR.
EVERETT D. GEORGE
BY
R. L. Miller
ATTORNEY

Patented Apr. 27, 1954

2,676,641

UNITED STATES PATENT OFFICE 2,676,641

KNIFE CLEANING DEVICE FOR BUTT SPLICING APPARATUS

Everett D. George, Cuyahoga Falls, Ohio, assignor, by mesne assignments, to The Goodyear Tire & Rubber Company, a corporation of Ohio Application February 18, 1952, Serial No. 272,079

10 Claims. (Cl. 154—9)

The present invention pertains to a form of knife cleaning device and the like for use in butt splicing apparatus employed in joining together the ends of rubber, plastic, and other similar material. More particularly, the invention is concerned with an attachment which is particularly advantageously adapted to be used in conjunction with butt splicing equipment of the type employed in splicing inner tubes for the removal of rubber particles which tend to accumulate on the heated cutting edges used for trimming the ends of the stock which are to be joined.

In the manufacture of inner tubes, a suitable rubber compound is extruded in the form of a tube of indeterminate length. This unvulcanized rubber tubular material or tube stock, as it is called, is then cut to predetermined lengths such that when the ends are joined, an endless, generally toroidically shaped fluid container of a predetermined dimension will be formed. The ends of each piece of tube stock are joined together by a butt splicing operation according to which a relatively small piece is trimmed off each of the ends of the material with a heated knife to render the stock tacky so that when the trimmed ends are mated and squeezed together, they will seal temporarily until the entire inner tube is vulcanized according to conventional practices.

When the tube stock is trimmed in the butt splicing apparatus, the excess stock which is removed by the heated knives has a tendency to adhere to the cutting edges thereof. This is detrimental for several reasons. The stock trimmings sticking to the cutting edge of the knife tend not only to cool the knife more quickly, but also to create an accumulation thereon in a short space of time. These factors necessitate a stepping up of the knife temperature to insure the proper degree of tackiness in the trimmed edges of the stock. Moreover, if the stock trimmings or particles are permitted to adhere to the heated knife for a prolonged period of time, they become at least partially vulcanized on the knife edge and thereafter cannot be readily removed.

If the accumulation of these trimmings or particles is permitted to build up on the knife edges, the cutting edges eventually become rough and an irregular cut results. When such irregular ends are spliced together, a bad splice is produced. It has been the established practice in the past to clean the knife edges manually after every third splice. The apparatus of the present invention has effectively eliminated this practice.

It will be apparent for the foregoing reasons as well as others which will be apparent to those skilled in the art that it is essential to remove all of the stock trimmings from the cutting edges and to keep the knives clean to avoid the production of defective articles and to reduce the cost of operation and upkeep of the equipment.

It is, therefore, an object of the present invention to effectively achieve the above-mentioned results.

To this end, it is also an object of the present invention to provide a device for automatically operating to maintain the cutting edges of the knives in butt splicer equipment clean and free from deposits of the material being spliced.

Other important objects and advantages of the apparatus of the present invention will be apparent from the following description of one embodiment of the invention.

Figure 2:
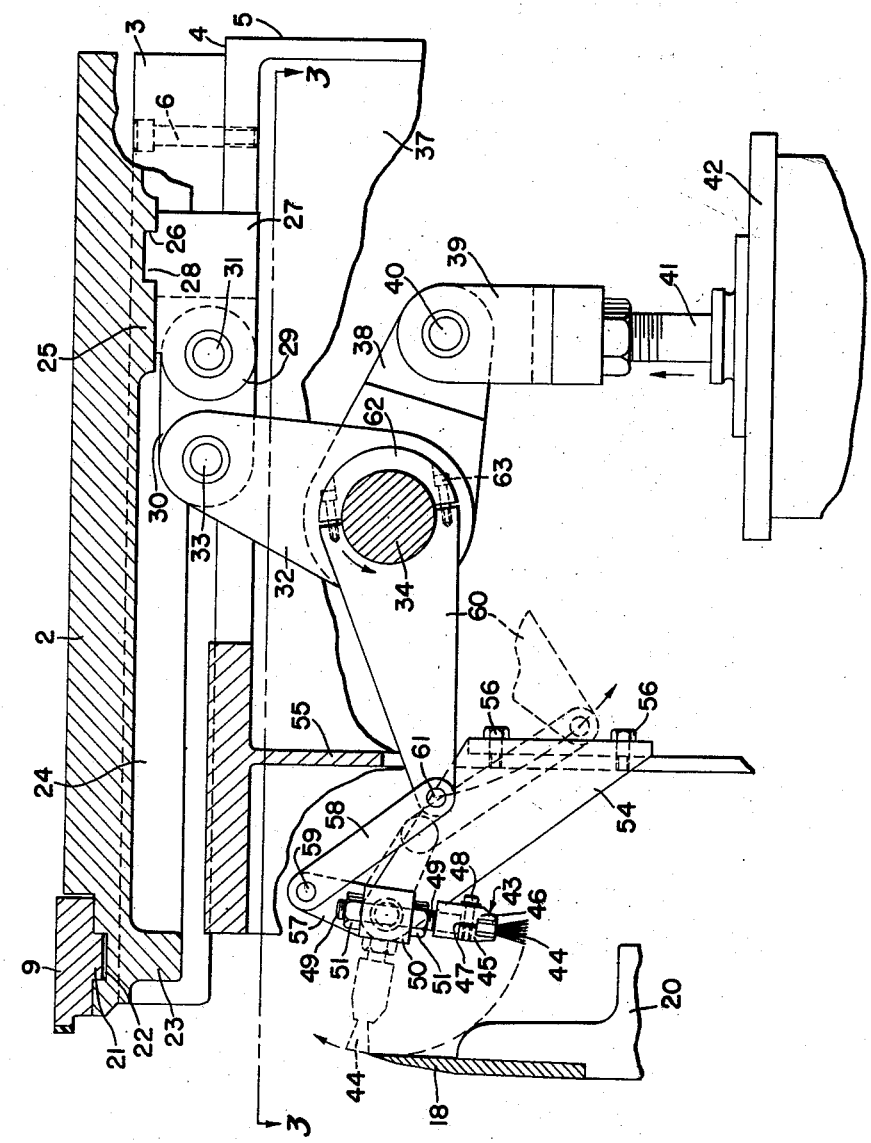
Figure 3:
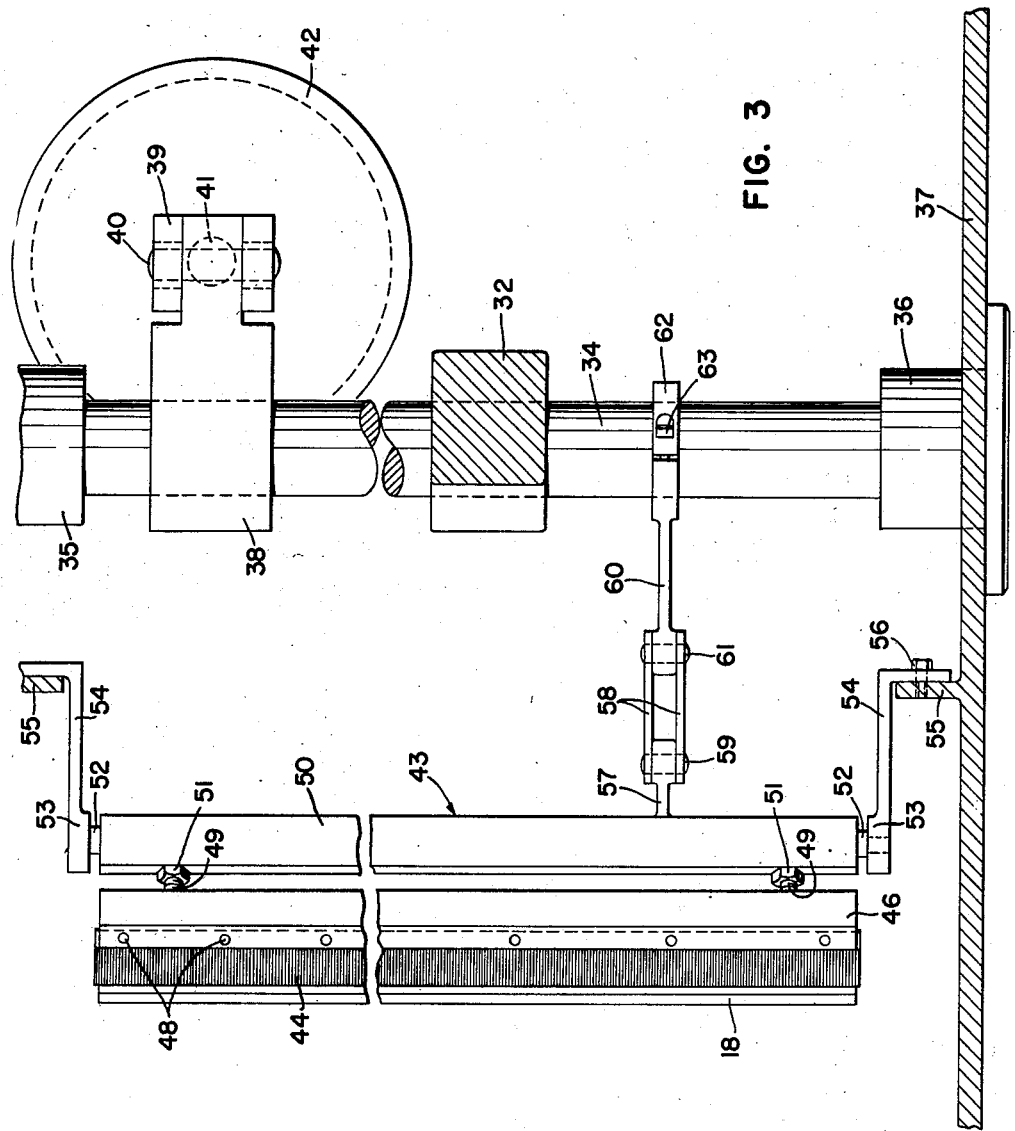

In the drawings, Fig. 1 is a side elevation with parts in section and broken away of a preferred form of butt splicing apparatus with which the teachings of the present invention are particularly advantageously adapted to be employed, the cutting edges being shown in cutting position. Fig. 2 is a partial elevation of one side of the apparatus of Fig. 1 with a knife in retracted position and illustrating the operation of the knife cleaning device after the cutting operation is completed. Fig. 3 is a horizontal section with parts broken away showing the knife cleaning device of Fig. 2 as seen from the line 3—3 therein.

Referring first to Fig. 1 of the drawings, the reference character 1 identifies the butt splicing apparatus generally. The butt splicing apparatus 1 has a pair of slide members or carriages 2 mounted for reciprocable movement in a horizontal plane along the ways 3 on the bed 4 (see Fig. 2) of the frame member 5 of the apparatus. The ways 3 comprise a pair of parallel bars which are secured to the bed 4 as by means of a plurality of cap screws 6 threaded into suitable tapped holes provided in the frame member 5.

The butt splicing apparatus 1 embodies a pair of clamping means 7 for holding the ends of the tube stock 8 securely in position for the trimming and jamming steps of the splicing operation. Each clamping means 7 comprises a clamp 10 and a cooperating guide member 9 which is mounted on the carriage 2 in a manner to be more fully explained hereinafter. The clamps 10 are suspended from the vertical supports 11 which are arranged in such fashion that they may be actuated in both a vertical and a horizontal plane with respect to the bed 4 of the frame member 5 of the butt splicing apparatus 1.

In each case the clamp 10 is secured to the vertical support 11 by means of a depending flange portion 12 therein which interfits with a bifurcated portion 13 on the clamp 10. A pin 14 extending through the bifurcated portion 13 of the clamp 10 and the depending flange portion 12 of the vertical support 11 serves to provide a tiltable mounting for each clamp in a direction transversely of the lateral dimension of the tube stock 8. A positioning member 15 is disposed adjacent the outermost end of each of the clamps 10 on the carriages 2. This positioning member 15 serves to prevent displacement of the clamp 10 in a direction longitudinally of the tube stock 8.

In certain of the operations of the butt splicing apparatus 1, it is necessary to provide an anvil 16 which is adapted to be positioned between the clamping means 7 for accommodating each of the ends of the tube stock 8 in the manner shown in Fig. 1. The anvil 16 provides the cutting surfaces 17 for coaction with the heated cutting edges or knives 18 in removing excess stock from the ends of the tube stock 8 and to provide a fresh tacky surface for joining the ends of the stock in the course of the splicing operation. A suitable actuating means (not shown) is provided for operating the support 19 for the anvil 16 to raise and lower it into and out of position with respect to the clamping means 7. A suitable means (not shown) is also provided for operating the actuating means 20 on which the knives 18 are mounted.

The guide 9 of each clamping means 7 is advantageously positioned and secured in place on its carriage 2 by means of a key portion 21 which fits into a groove 22 (see Fig. 2) extending laterally of the carriage. The carriage 2 in each case has a stiffening rib 23 disposed directly beneath the position of the guide 9 thereon. This stiffening rib 23 together with a pair of locating ribs 24 arranged in parallel relation to each other are formed integrally with the underside of the carriage 2. The locating ribs 24 serve to cooperate with the ways 3 on the bed 4 of the frame member 5 in the butt splicing apparatus 1 to define a path of travel for the carriages 2 in a horizontal plane toward and away from each other.

A boss portion 25 is formed on the underside of the carriage 2 and has a groove 26 machined thereacross to form a means of locating the hinge block 27 with the key portion 28 thereof fitted into the groove and secured thereto. The hinge block 27 has a bifurcated end portion 29 which is adapted to receive a link 30 secured thereto as by means of a pin 31. The link 30 is similarly attached to an arm 32 as by means of a pin 33.

The arm 32 is fixed to a shaft 34 which is supported by the bearing members 35 and 36 in a horizontal position extending substantially transversely of the carriage 2 (see Fig. 3). Each of the bearing members 35 and 36 is suitably secured to the web portion 37 of the frame member 5 in such fashion that the shaft 34 may be rotated about its longitudinal axis. The shaft 34 also has secured thereto an arm 38 the opposite end of which is fitted into the bifurcated member 39 to which it is secured by means of the pin 40 extending therethrough. The bifurcated member 39 is in turn mounted upon the free end of the piston rod 41 of a pneumatic cylinder 42.

The knife cleaning device of the present invention is identified generally by the reference numeral 43 in Figs. 2 and 3 of the drawings. The knife cleaning device 43 embodies a removing means or wiper element 44 which may advantageously take the form of a brush or the like. The wiper element 44 is mounted between a longitudinally extending member 45 and a holder or clamp member 46. A space 47 disposed in the base of the recess formed by the member 45 and the holder 46 enables the cap screw 48 threaded into the member 45 to tightly clamp the wiper element 44 in place in the recess under compression.

The holder 46 is provided with a plurality of externally threaded studs 49, one end of each of which is secured to the holder while the other end extends through the bar 50. A pair of lock nuts 51 disposed on opposite sides of the pivotally mounted bar 50 serve to provide adjustment for the position of the holder 46 and the wiper element 44 as the latter becomes worn down in the course of its use. The bar 50 is provided with end portions 52, each of which is mounted in a bearing portion 53 on each of the brackets 54. The brackets 54 which thus serve to support the bar 50 and the holder 46 in rotatable relation are supported from the web portions 37 of the frame member 5 by means of the lugs 55 formed thereon. The brackets 54 are secured in each instance to the lugs 55 by means of cap screws 56.

The bar 50 of the knife cleaning device 43 is provided with a projecting boss portion 57 which is secured to the parallel links 58 in hinged relation by means of a pin 59. The links 58 are hingedly secured to the arm 60 by means of a pin 61. The end of the arm 60 opposite that attached to the links 58 is secured to the shaft 34 by means of a semi-circular collar member 62. The collar member 62 is attached to the end of the arm 60 by means of a pair of cap screws 63 which are threaded into the end of said arm.

At the beginning of the cycle of operation of the butt splicing apparatus 1, the clamps 10 of the clamping means 7 are raised above and spaced from their cooperating guides 9 on the carriages 2 of the apparatus. The anvil 16 is also positioned above the carriages 2 and located between the clamps 10 when the butt splicing apparatus 1 is prepared for the next cycle of operations. With the parts of the butt splicing apparatus 1 in the arrangement described, that portion of the tube stock 8 intermediate the ends thereof is loosely draped over the supports 11, while the ends of the tube stock are placed on the guides 9 so that they project slightly beyond the adjacent edges of the guides in the manner indicated in Fig. 1 of the drawings.

Next, the clamps 10 with the anvil 16 disposed therebetween are lowered into the position shown in Fig. 1 with the several members in contact with the tube stock 8 and with the clamps holding the material firmly in place against the top of the guides 9. The knife actuating means 20 on which the knives 18 are mounted are then energized to cause the latter to cut into and trim the strips 64 from the ends of the tube stock 8 while the ends are in contact with the cutting surfaces 17 of the anvil 16. Thereafter, the pneumatic cylinder 42 is caused to operate for an instant to move the clamping means 7 with the trimmed ends of the tube stock 8 firmly held in place on the guides 9 horizontally away from the anvil 16 a short distance.

This back-away movement of the clamping means 7 is sufficient to provide clearance for the anvil 16 and the knives 18 to be retracted downwardly by the action of the knife actuating means 20 and the supports 19 for the anvil. This withdrawal of the anvil 16 and knives 18 is thus accomplished without wiping against the freshly trimmed ends of the tube stock 8. The back-away motion mentioned above is achieved through the action of the pneumatic cylinders 42, one being provided for each side of the apparatus.

After the anvil 16 and the knives 18 have been withdrawn from between the clamping means 7 to a position below the level of the bed 4 of the frame member 5, fluid is simultaneously admitted to the lower part of each of the pneumatic cylinders 42. When the fluid is introduced to the right hand pneumatic cylinder 42, for example, the piston rod 41 moves in the direction of the arrow in Fig. 2. This shifting of the piston rod 41 moves the bifurcated member 39 and the arm 38 attached to the shaft 34, causing the latter to rotate in a counter-clockwise direction. This rotation of the shaft 34 causes the arm 32 secured to the shaft to move through an arcuate path in the same direction, thereby shifting the link 30 and the carriage 2 (see Fig. 2) to the left.

It will be understood that the left-hand pneumatic cylinder 42 (not shown) associated with the other portion of the butt splicing apparatus I seen in Fig. 1 will operate in the exact reverse of that described above. As a result, the carriages 2 with the clamping means 7 in position to hold the tacky, freshly trimmed ends of the tube stock 8 are moved toward each other. This action brings about the mating of the free ends of the tube stock and squeezes them together to render the strip endless.

Simultaneously with the step of moving the carriages 2 and their associated clamping means into the splicing position in the cycle of operations of the butt splicing apparatus 1, the knife cleaning device 43 will be actuated. The rotation of the shaft 34, as seen in Fig. 2, causes the arm 60 secured thereto to move downwardly through an arcuate path approaching the dotted line positions illustrated. This movement of the arm 60 shifts the links 58, swinging the pivotally mounted bar 50 by reason of their attachment to the boss 57 thereon. The rotation of the pivotally mounted bar 50 causes the holder 46 carrying the brush 44 to swing upwardly as indicated by the dotted lines in Fig. 2. The brush 44 passes over the cutting edge of the knife 18, freeing it of any particles of rubber which may have become adhered to it following the cutting operation.

It will be understood that while the corresponding cylinder 42 on the left hand side of the butt splicing apparatus I will cause the mechanism associated therewith to operate in reverse order to that previously described as related to that portion of the apparatus shown in Fig. 2, both knives 18 will be simultaneously contacted by the brushes 44, and the cleaning operation will be effectively accomplished.

Other forms of structure for aiding in the removal of the rubber trimmings 64 from the knives 18 may also be associated with the knife cleaning device 43 herein described.

While certain representative embodiments and details have been shown for the purpose of illustrating the invention, it will be apparent to those skilled in this art that various changes and modifications may be made therein without departing from the spirit or scope of the invention.

I claim:

1. In a butt splicing apparatus embodying a pair of clamping means for holding the ends of the material to be joined, a slide member cooperating with each clamping means mounted for shiftable movement, means for shifting the slide members, and a cutting means for trimming each of the ends of the material to be joined, a device for cleaning each of the cutting means comprising means for removing the trimmings from the cutting means; and means coacting with the shifting means for intermittently bringing the removing means into contact with the cutting means.

2. In a butt splicing apparatus embodying a pair of clamping means for holding the ends of the material to be joined, a slide member cooperating with each clamping means mounted for shiftable movement, means for shifting the slide members, and a cutting means for trimming each of the ends of the material to be joined, a device for cleaning each of the cutting means comprising means for wiping the cutting means to remove the trimmings therefrom; means for intermittently actuating the wiping means to contact the cutting means; and means for connecting the actuating means and the shifting means in driving relation.

3. In a butt splicing apparatus embodying a pair of clamping means for holding the ends of the material to be spliced, a slide member cooperating with each clamping means mounted for shiftable movement, means for shifting the slide members, a cutting means for trimming each of the ends of the material to be joined, and means for actuating the cutting means, a device for cleaning each of the cutting means comprising means for wiping the cutting means to remove the trimmings therefrom; and means for actuating the wiping means to contact the cutting means in predetermined time relation to the operation of the actuating means for the cutting means.

4. In a butt splicing apparatus embodying a pair of clamping means for holding the ends of the material to be spliced, a slide member cooperating with each clamping means mounted for shiftable movement, means for shifting the slide members, a cutting means for trimming each of the ends of the material to be joined, and means for actuating the cutting means, a device for cleaning each of the cutting means comprising means for wiping the cutting means to remove the trimmings therefrom; means for actuating the wiping means to contact the cutting means in predetermined timed relation to the operation of the actuating means for the cutting means; and means for connecting the shifting means and the actuating means for the wiping means.

5. In a butt splicing apparatus embodying a pair of clamps for holding the ends of the material to be joined, a carriage for each clamp mounted for shiftable movement causing the clamps to move toward and away from each other, means for shifting the slide members, and a knife for trimming each of the ends of the material while they are retained by the clamps, a device for cleaning each of the knives and removing the trimmings therefrom comprising a wiper element; means for mounting the wiper element in swingable relation to the knife; and means coacting with the shifting means for actuating the mounting means to bring the wiper element into and out of contact with the knife.

6. In a butt splicing apparatus embodying a pair of clamps for holding the ends of the material to be joined, a carriage for each clamp mounted for shiftable movement causing the clamps to move toward and away from each other, means for shifting the slide members, and a knife for trimming each of the ends of the material while they are retained by the clamps, a device for cleaning each of the knives and removing the trimmings therefrom comprising a wiper element; a swingable mounting for the wiper element; and a linkage for connecting the swingable mounting in driving relation to the shifting means for the carriages.

7. Apparatus for the splicing of rubber comprising a clamp for holding each of the ends of the rubber to be spliced; carriages for moving the clamps toward and away from each other; knives for trimming and heating the ends of the rubber preparatory to splicing them; means for actuating the knives; a drive mechanism for shifting each carriage; a cleaning device for each knife; and means connecting with the drive mechanism for actuating the cleaning device and bringing the same into contact with the knife.

8. Apparatus of the type defined in claim 7 in which the drive mechanism for each carriage comprises a rotatably mounted shaft; means for rotating the shaft in opposite directions; and linkage operatively connecting the shaft and the carriage.

9. Apparatus of the type defined in claim 8 in which the cleaning device comprises a wiper element; a swingable mounting for the wiper element; and means for connecting the shaft for each drive mechanism and the swingable mounting of the wiper element for simultaneous actuation.

10. Apparatus of the type defined in claim 9 in which the cleaning device comprises a brush; a swingably mounted bar supporting the brush; and a linkage connecting the shaft for each drive mechanism with the swingably mounted bar for actuation simultaneously therewith.

References Cited in the file of this patent

UNITED STATES PATENTS

| Number | Name | Date |
| --- | --- | --- |
| 2,057,021 | Gammeter | Oct. 13, 1936 |
| 2,273,463 | Campbell et al. | Feb. 17, 1942 |
| 2,541,696 | George | Feb. 13, 1951 |
| 2,576,940 | Iknayan et al. | Dec. 4, 1951 |